US010900561B2

(12) United States Patent
Lee

(10) Patent No.: US 10,900,561 B2
(45) Date of Patent: Jan. 26, 2021

(54) METHOD OF SETTING NEUTRAL POSITIONS IN TRANSMISSION GEAR ACTUATOR

(71) Applicant: HYUNDAI DYMOS INCORPORATED, Seosan-si (KR)

(72) Inventor: Man Bok Lee, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 160 days.

(21) Appl. No.: 16/193,445

(22) Filed: Nov. 16, 2018

(65) Prior Publication Data
US 2019/0186631 A1    Jun. 20, 2019

(30) Foreign Application Priority Data

Dec. 18, 2017    (KR) .................. 10-2017-0174253

(51) Int. Cl.
*F16H 61/28*    (2006.01)
*F16H 59/68*    (2006.01)
*F16H 63/20*    (2006.01)

(52) U.S. Cl.
CPC ............ *F16H 61/28* (2013.01); *F16H 59/68* (2013.01); *F16H 63/20* (2013.01); *F16H 2059/6823* (2013.01); *F16H 2061/283* (2013.01); *F16H 2342/02* (2013.01)

(58) Field of Classification Search
None
See application file for complete search history.

(56) References Cited

U.S. PATENT DOCUMENTS

| 8,831,845 B1 * | 9/2014 | Tao ...................... B60W 10/113 |
| | | 701/58 |
| 2014/0358383 A1 * | 12/2014 | Tao ..................... F16H 61/0403 |
| | | 701/51 |

FOREIGN PATENT DOCUMENTS

| CA | 2997889 A1 * | 3/2017 | .............. F16D 11/14 |
| JP | 2001-50390 A | 2/2001 | |
| JP | 2006-283821 A | 10/2006 | |
| JP | 2010-121686 A | 6/2010 | |
| JP | 2013-145061 A | 7/2013 | |
| KR | 10-0300292 B1 | 6/1994 | |
| KR | 10-2011-0092075 A | 8/2011 | |
| KR | 10-2013-0116757 A | 10/2013 | |
| KR | 10-2015-0076486 A | 7/2015 | |
| KR | 10-2015-0129111 A | 11/2015 | |

\* cited by examiner

*Primary Examiner* — Justin Holmes
(74) *Attorney, Agent, or Firm* — Novick, Kim & Lee, PLLC; Jae Youn Kim; Jihun Kim

(57) ABSTRACT

Provided is a method of setting a neutral position of each speed-range shift rail for accurate gear-shifting in a transmission gear actuator. The method includes a reference neutral position determination step of determining a reference neutral position as an absolutely neutral position by reciprocating a shift finger in a free-range shift rail, and a speed-range neutral position determination step of determining a neutral position of each speed-range shift rail by reciprocating a control finger in the speed-range shift rail. Since the neutral position of each speed-range shift rail is set through the above method, it is possible to perform more accurate gear-shifting and prevent incomplete gear engagement by performing the gear-shifting at the neutral position of each speed-range shift rail.

8 Claims, 4 Drawing Sheets

METHOD OF SETTING NEUTRAL POSITIONS IN TRANSMISSION GEAR ACTUATOR

CROSS-REFERENCE TO RELATED APPLICATIONS

The instant application claims priority to Korean patent application No. 10-2017-0174253 filed on Dec. 18, 2017, the entire disclosure of which is hereby incorporated by reference.

BACKGROUND OF THE INVENTION

Field of the Invention

Exemplary embodiments of the present disclosure relate to a method of setting neutral positions in a transmission gear actuator, and more particularly, to a method of setting a neutral position of each speed-range shift rail for accurate gear-shifting in a transmission gear actuator.

Description of the Related Art

In recently years, an automated manual transmission capable of achieving convenient gear-shifting of an automatic transmission and excellent fuel efficiency of a manual transmission has been developed and utilized. This automated manual transmission is to automatically control a clutch and a shift lever using a gear actuator while the manual transmission is used as it is. Here, various types of gear actuators such as pneumatic, hydraulic, and electric gear actuators have been developed.

Among them, the electric gear actuator includes a select motor for select operation and a shift motor for shift operation. The select motor and the shift motor are operated by a predetermined load in the state in which a control finger is in an initial neutral position, thereby moving the control finger to the operating positions of shift lugs.

In such an automated manual transmission, it is necessary to satisfy both of a rapid shifting response and a smooth shifting feeling for the convenience of drivers. In order to meet these conflicting demands, in controlling the shift operation, a sleeve must be moved as fast as possible up to a sync start position where a synchronizer ring begins to connect to the cone of a clutch gear, and then moved as slow as possible by soft power until the synchronization is completed. If the sync start position is determined to be too close to a neutral position in controlling the shift operation, the sleeve must be further moved to an actual sync start position, which may increase a shifting time and decrease a response. On the other hand, if the sync start position is determined to be too far from the neutral position, shifting shocks may occur. Therefore, it is important to perform more accurate neutral position learning.

FIG. 1 is a view schematically illustrating a conventional gear-shifting device for an automated manual transmission, and FIG. 2 is a diagram schematically illustrating a conventional method of setting neutral positions in a transmission gear actuator.

Referring to FIGS. 1 and 2, the conventional method of setting neutral positions in a gear actuator for an automated manual transmission performs gear-shifting in such a manner that a shift finger 11 within a gear actuator 1, which is linked with a control finger 12 to operate simultaneously therewith, reciprocates in a shift rail 21 to set a reference neutral position RM as an absolutely neutral position, and the control finger 12 is moved from the reference neutral position RM to a reference left shift position RL and a reference right shift position RR in a speed-range shift rail.

However, the gear-shifting may not be smoothly performed since the shift stroke and position are significantly deviated in comparison with an initial position due to a cumulative tolerance by the traveling of the vehicle for a long time, as well as the excess of its cumulative tolerance and the deviation between products due to many shift operation-related parts such as shift rails, forks, sleeves, synchros, clutch gears, and gears.

That is, as illustrated in FIG. 2, various types of deviations are caused by the cumulative tolerance in each speed-range shift rail. That is, left/right completion points of gear engagement differ from each other with respect to the reference neutral position RM.

For example, a 6th-speed shift position 6T and an R-speed shift position RT are within the moving range of the shift finger 11 since they are between the reference left shift position RL and the reference right shift position RR in a 6th/R-range shift rail 22. Therefore, the gear-shifting in the 6th/R-range shift rail 22 can be performed, but the reference shifting point of the gear actuator differs from an actual shifting completion determination point of gear engagement. In particular, shifting shocks are concerned when the shifting completion point of gear engagement is too short as in the 2rd-speed shift position 2T of a 2nd/4th-range shift rail 23.

In addition, when a 3rd-speed shift position 3T and a 1st-speed shift position 1T are out of the moving range of the shift finger 11 by the cumulative tolerance as in a 3rd/7th-range shift rail 24 and a 5th/1st-range shift rail 25, shifting shocks and noise may occur due to an occurrence of incomplete engagement in 3rd-speed and 1st-speed shifting.

In addition, the shift motor for the gear actuator used in the related art is a hall sensor-type shift motor capable of checking only a relative position, and it is necessary to perform shift neutral position learning in a gear actuator single unit and a transmission-assembled state. It is possible to find a neutral position only when the learning is performed every time when starting an engine in a vehicle. That is, a shifting time may be lengthened since the neutral position learning is frequently performed to check the relative position due to the application of the motor hall sensor.

SUMMARY OF THE INVENTION

The present disclosure has been made in view of the above-mentioned problems, and an object thereof is to provide a method of setting a neutral position of each speed-range shift rail for accurate gear-shifting in a transmission gear actuator.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

To accomplish the above object, a method of setting neutral positions in a transmission gear actuator according to an aspect of the present disclosure includes determining a reference neutral position as an absolutely neutral position by reciprocating a shift finger in a free-range shift rail, and determining a neutral position of each speed-range shift rail by reciprocating a control finger in the speed-range shift rail.

In the determining a reference neutral position, the reference neutral position as the absolutely neutral position may be determined by reciprocating the shift finger in a shift rail arranged inside a gear actuator.

The determining a neutral position of each speed-range shift rail may include determining a first shift rail's neutral position by reciprocating the control finger in a first shift rail, determining a second shift rail's neutral position by reciprocating the control finger in a second shift rail, determining a third shift rail's neutral position by reciprocating the control finger in a third shift rail, and determining a fourth shift rail's neutral position by reciprocating the control finger in a fourth shift rail.

In the determining a neutral position of each speed-range shift rail, when the first and second shift rails are connected to each other and the third and fourth shift rails are connected to each other, a first control finger may move to the second shift rail after the determination of the first shift rail's neutral position to determine the second shift rail's neutral position, and a second control finger may move to the fourth shift rail after the determination of the third shift rail's neutral position to determine the fourth shift rail's neutral position.

In the determining a neutral position of each speed-range shift rail, when the control finger moves from one speed-range shift rail to another speed-range shift rail, it may move from a neutral position of one speed-range shift rail to the reference neutral position and then move to another speed-range shift rail.

In more detail, when the first to fourth shift rails are connected to each other, the determining a neutral position of each speed-range shift rail may further include performing first select movement in which when the control finger moves from the first shift rail to the second shift rail, it moves from the first shift rail's neutral position to the reference neutral position and then moves to the second shift rail, performing second select movement in which when the control finger moves from the second shift rail to the third shift rail, it moves from the second shift rail's neutral position to the reference neutral position and then moves to the third shift rail, and performing third select movement in which when the control finger moves from the third shift rail to the fourth shift rail, it moves from the third shift rail's neutral position to the reference neutral position and then moves to the fourth shift rail.

In addition, when the first and second shift rails are connected to each other and the third and fourth shift rails are connected to each other, the determining a neutral position of each speed-range shift rail may further include performing first select movement in which when a first control finger moves from the first shift rail to the second shift rail, it moves from the first shift rail's neutral position to the reference neutral position and then moves to the second shift rail, and performing second select movement in which when a second control finger moves from the third shift rail to the fourth shift rail, it moves from the third shift rail's neutral position to the reference neutral position and then moves to the fourth shift rail.

Here, a current value of a shift motor for moving the control finger when the control finger reciprocates in each shift rail may be measured to determine a portion to which a constant load is applied as both ends of the shift rail and determine the center thereof as a neutral position.

In addition, a neutral position of each shift rail may be determined by reciprocating the control finger many times in the shift rail and then calculating an average value of the total moved distance.

In addition, an angle sensor may be provided to measure an angle of rotation and rotational speed of a shift motor for moving the shift finger and the control finger, and after both of the angle of rotation and rotational speed of the shift motor are set to be "0" at the reference neutral position, the angle of rotation and rotational speed of the shift motor may be measured to determine a relative position of the control finger.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
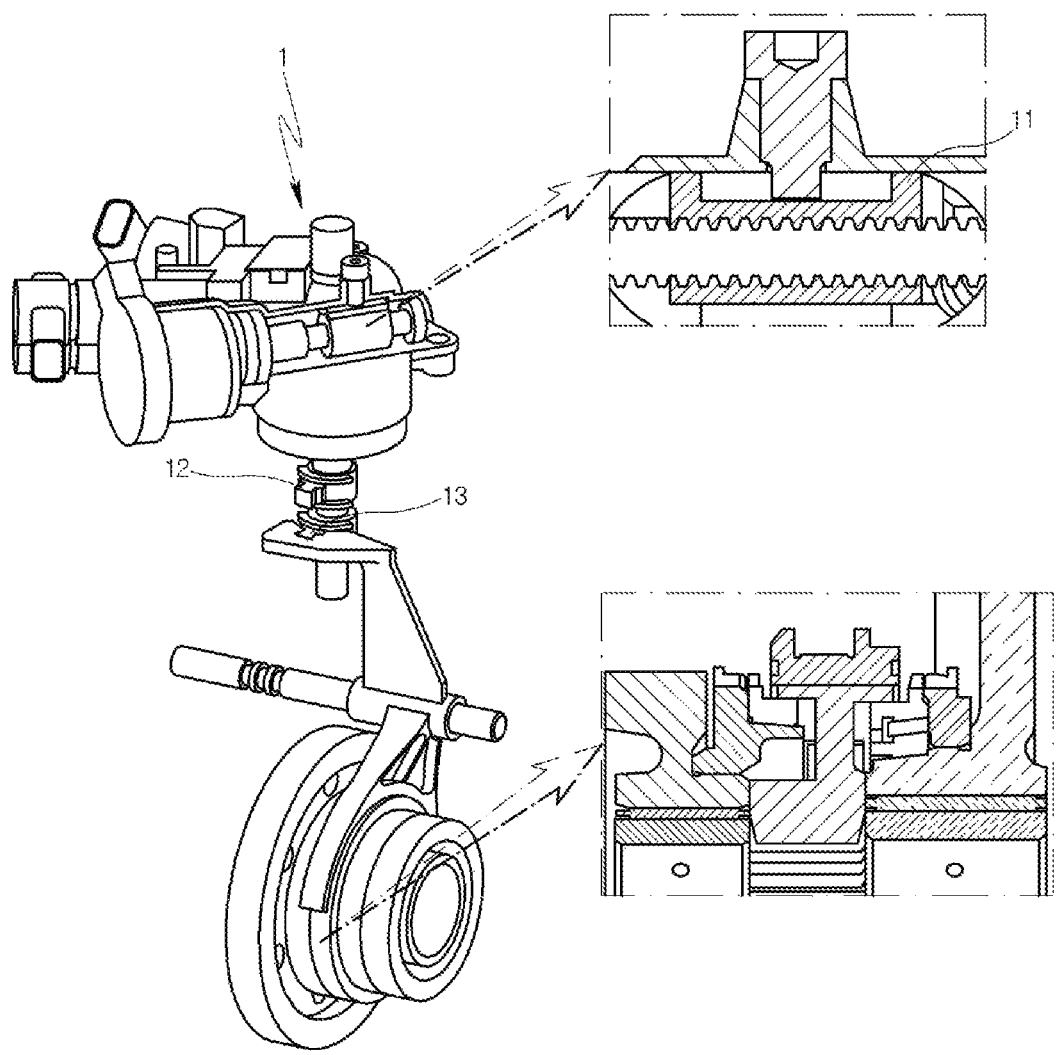
FIG. 1 is a view schematically illustrating a conventional gear-shifting device for an automated manual transmission.
Figure 2:
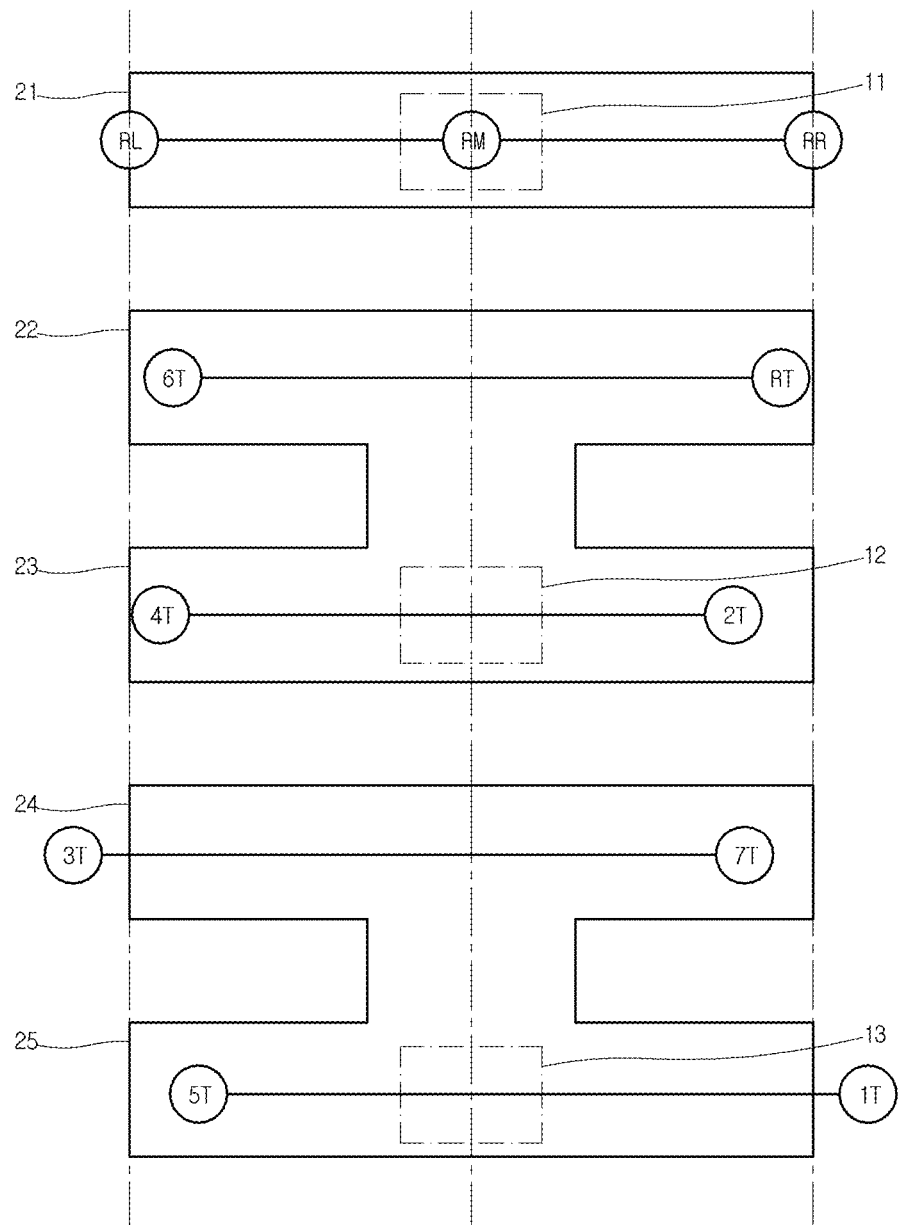
FIG. 2 is a diagram schematically illustrating a conventional method of setting neutral positions in a transmission gear actuator.

In order to facilitate understanding of the features of the present disclosure, a method of setting neutral positions in a transmission gear actuator according to exemplary embodiments of the present disclosure will be described below in more detail.

It should be noted that reference numerals are added to the components of the accompanying drawings to facilitate understanding of the embodiments described below and the same reference numbers will be used throughout the drawings to refer to the same or like parts wherever possible. In certain embodiments, detailed descriptions of constructions or functions well known in the art may be omitted to avoid obscuring appreciation of the disclosure by a person of ordinary skill in the art.

A method of setting neutral positions in a transmission gear actuator according to an embodiment of the present disclosure includes a reference neutral position determination step of determining a reference neutral position as an absolutely neutral position by reciprocating a shift finger in a free-range shift rail, and a speed-range neutral position determination step of determining a neutral position of each speed-range shift rail by reciprocating a control finger in the speed-range shift rail.

In more detail, the speed-range neutral position determination step includes a first shift rail's neutral position determination step of determining a first shift rail's neutral position by reciprocating the control finger in a first shift rail, a second shift rail's neutral position determination step of determining a second shift rail's neutral position by reciprocating the control finger in a second shift rail, a third shift rail's neutral position determination step of determining a third shift rail's neutral position by reciprocating the control finger in a third shift rail, and a fourth shift rail's neutral position determination step of determining a fourth shift rail's neutral position by reciprocating the control finger in a fourth shift rail.

Although four speed-range shift rails are described in the embodiment of the present disclosure, the method is applied to the case where the speed-range shift rails are less than four or more than four in the same manner.

The neutral positions of the respective speed-range shift rails measured by the above method differ from each other. Therefore, when the control finger moves to the other speed-range shift rails, it moves to the reference neutral position and then moves to the other speed-range shift rails.

That is, when the control finger moves from one speed-range shift rail to another speed-range shift rail, it moves from the neutral position of one speed-range shift rail to the reference neutral position, and then moves to another speed-range shift rail.

In more detail, in the speed-range neutral position determination step, when the first to fourth shift rails are connected to each other, the control finger moves from the first shift rail's neutral position to the reference neutral position and then moves to the second shift rail for movement from the first shift rail to the second shift rail, the control finger moves from the second shift rail's neutral position to the reference neutral position and then moves to the third shift rail for movement from the second shift rail to the third shift rail, and the control finger moves from the third shift rail's neutral position to the reference neutral position and then moves to the fourth shift rail for movement from the third shift rail to the fourth shift rail.

Hereinafter, the method of setting neutral positions in a transmission gear actuator according to the embodiment of the present disclosure will be described in more detail with reference to the accompanying drawings by applying it to a 7-speed automated manual transmission.

Figure 3:
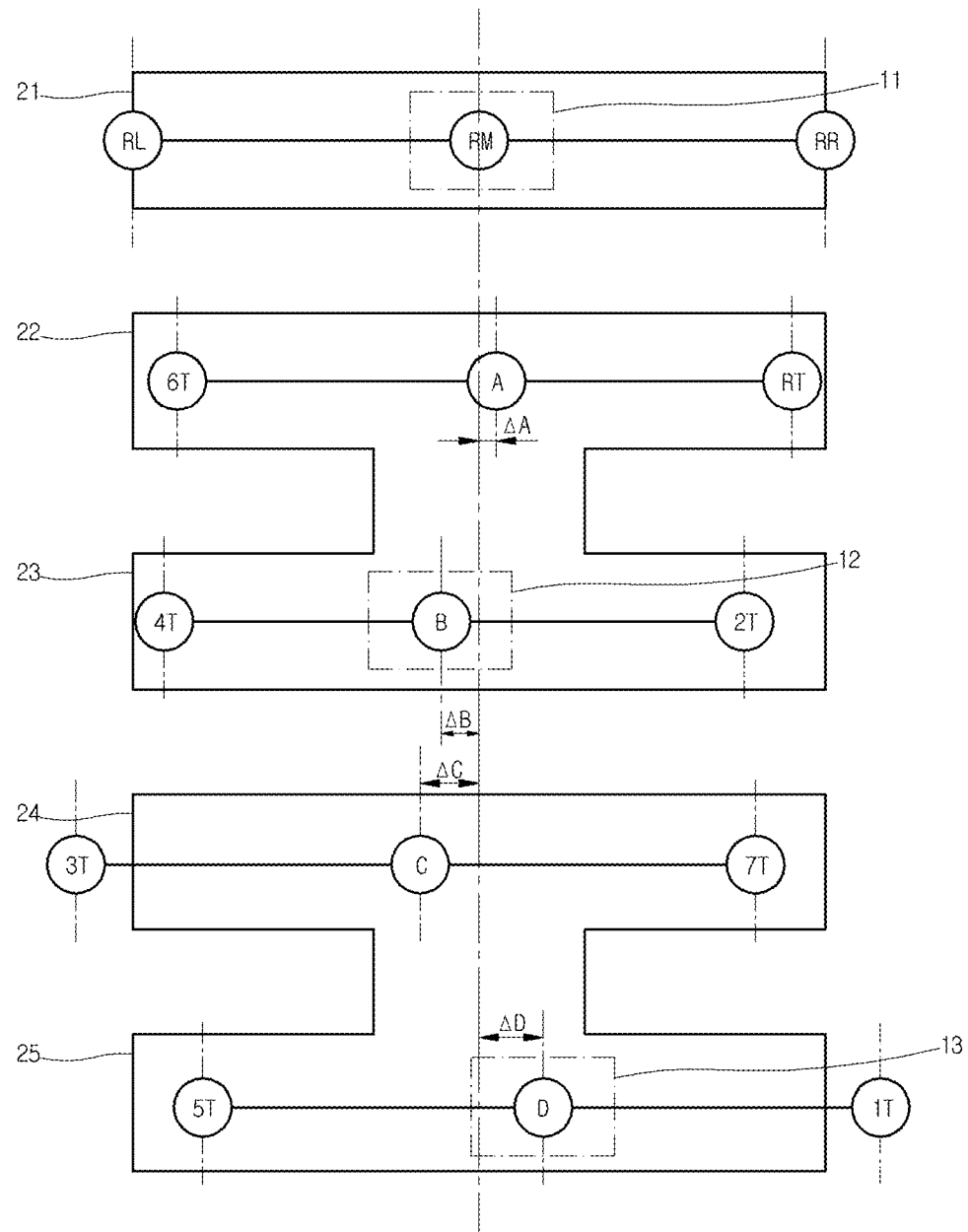
FIG. 3 is a diagram schematically illustrating a method of setting neutral positions in a transmission gear actuator according to an embodiment of the present disclosure.

That is, referring to FIG. 3, the free-range shift rail is a shift rail 21 arranged inside a gear actuator, and a reference neutral position RM as an absolutely neutral position is determined by reciprocating a shift finger 11 in the shift rail.

The first shift rail corresponds to a 6th/R-range shift rail 22, and the first shift rail's neutral position corresponds to a 6th/R-range neutral position A.

The second shift rail corresponds to a 4th/2nd-range shift rail 23, and the second shift rail's neutral position corresponds to a 4th/2nd-range neutral position B.

The third shift rail corresponds to a 3rd/7th-range shift rail 24, and the third shift rail's neutral position corresponds to a 3rd/7th-range neutral position C.

The fourth shift rail corresponds to a 5th/1st-range shift rail 25, and the fourth shift rail's neutral position corresponds to a 5th/1st-range neutral position D.

The 6th/R-range shift rail 22 and the 4th/2nd-range shift rail 23 correspond to even-numbered shift rails and are connected to each other. A neutral position is determined by moving an even-numbered finger 12 as a first control finger in the 6th/R-range shift rail 22 and the 4th/2nd-range shift rail 23.

The 3rd/7th-range shift rail 24 and the 5th/1st-range shift rail 25 correspond to odd-numbered shift rails and are connected to each other. A neutral position is determined by moving an odd-numbered finger 13 as a second control finger in the 3rd/7th-range shift rail 24 and the 5th/1st-range shift rail 25.

However, this is merely an example and the present disclosure is not limited thereto. For example, the method of the present disclosure may be applied to any type of automatic transmission.

Figure 4:
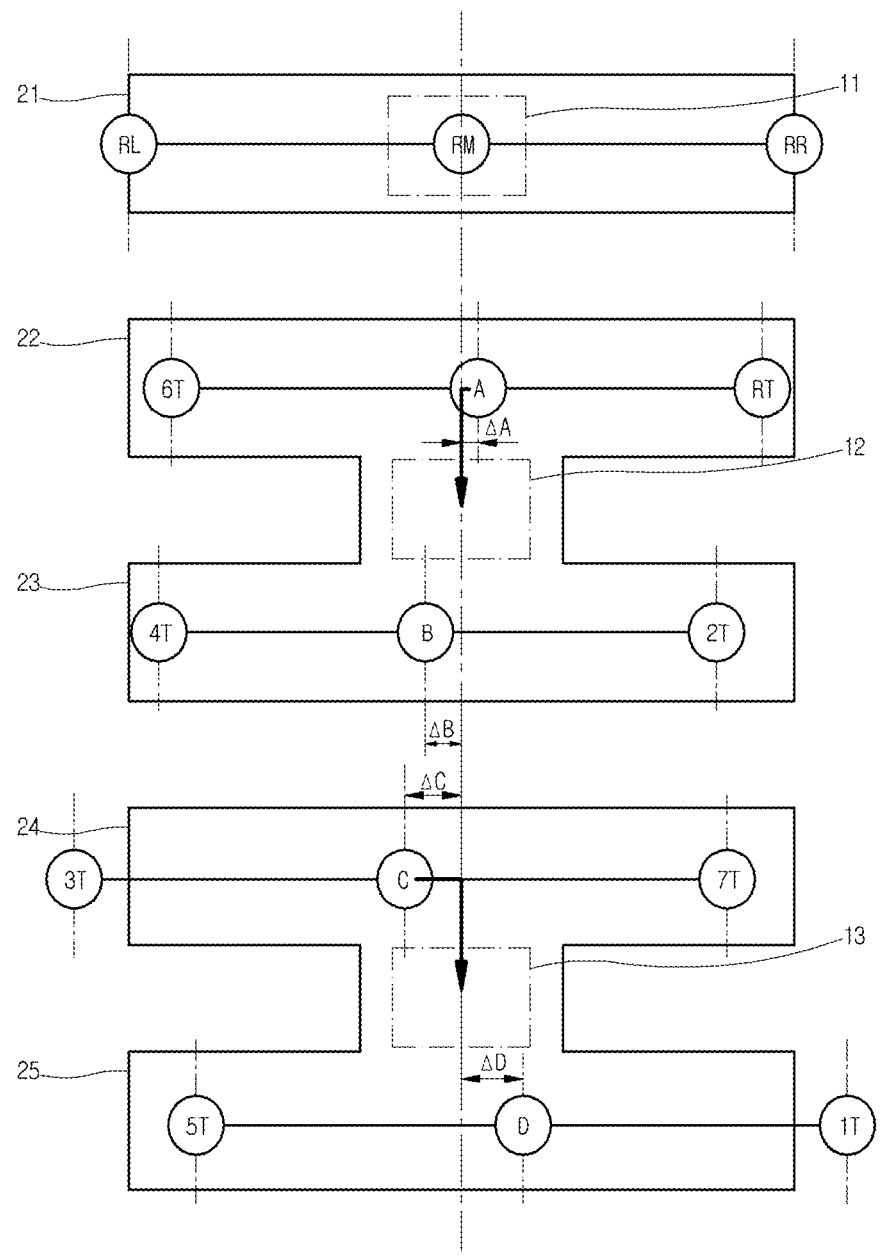
FIG. 4 is a diagram schematically illustrating select movement in the method of setting neutral positions in a transmission gear actuator according to the embodiment of the present disclosure.

FIG. 3 is a diagram schematically illustrating the method of setting neutral positions in a transmission gear actuator according to the embodiment of the present disclosure. FIG. 4 is a diagram schematically illustrating select movement in the method of setting neutral positions in a transmission gear actuator according to the embodiment of the present disclosure.

Referring to FIGS. 3 and 4, the method of setting neutral positions in a transmission gear actuator according to the embodiment of the present disclosure includes a reference neutral position determination step of determining a reference neutral position RM as an absolutely neutral position by reciprocating a shift finger 11 in a free-range shift rail 21 as a shift rail arranged inside a gear actuator, and a speed-range neutral position determination step of determining a neutral position of each speed-range shift rail by reciprocating a corresponding even-numbered finger 12 or odd-numbered finger 13 as a control finger in the speed-range shift rail.

In more detail, in the speed-range neutral position determination step, a 6th/R-range neutral position A is determined and learned by reciprocating the even-numbered finger 12 as a first control finger in a 6th/R-range shift rail 22.

A 4th/2nd-range neutral position B is determined and learned by moving the even-numbered finger 12 to a 4th/2nd-range shift rail 23 and reciprocating the even-numbered finger 12 in the 4th/2nd-range shift rail 23.

A 3rd/7th-range neutral position C is determined and learned by reciprocating the odd-numbered finger 13 as a second control finger in a 3rd/7th-range shift rail 24.

A 5th/1st-range neutral position D is determined and learned by moving the odd-numbered finger 13 to a 5th/1st-range shift rail 25 and reciprocating the odd-numbered finger 13 in the 5th/1st-range shift rail 25.

As an example of determining the neutral position of the shift rail, the neutral position is determined by reciprocating the control finger many times in each shift rail and then calculating an average value of the total moved distance. Of course, the method of determining the neutral position is not limited thereto, and various known methods may be applied thereto.

A current value of a shift motor (not shown) for moving the control finger when the control finger reciprocates in each shift rail is measured to determine a portion to which a constant load is applied as both ends of the shift rail and determine the center thereof as a neutral position.

For example, when the current value of the shift motor is measured while the shift finger 11 reciprocates in the free-range shift rail 21 and the shift finger 11 moves to the left and reaches a reference left shift position RL, the movement of the shift finger 11 is restricted to apply a constant load to the shift motor, thereby causing a rapid increase in current consumption. When the shift finger 11 moves to the right and reaches a reference right shift position RR, the movement of the shift finger 11 is restricted to apply a constant load to the shift motor, thereby causing a rapid increase in current consumption.

Accordingly, it is possible to determine the distance between the reference left shift position RL and the reference right shift position RR through the graph of the current consumption to the rotational speed of the shift motor, and thereby to determine the final reference neutral position RM of the free-range shift rail 21.

Of course, the method of determining both end positions of the shift rail is not limited thereto, and various known methods may be applied thereto.

The shift motor includes an angle sensor to measure the angle of rotation and rotational speed of the shift motor for moving the shift finger 21 and the control finger.

That is, when the reference neutral position RM is determined through the above method, both of the angle of rotation and rotational speed of the shift motor are set to be "0" at the reference neutral position RM set as an absolutely neutral position, and the angle of rotation and rotational speed of the shift motor are then measured to determine the relative position of the control finger.

Accordingly, when the reference neutral position (RM) as an absolute reference is set and stored as described above, it is possible to reduce a shifting time since learning for frequently setting neutral positions is not performed and learning for reconfirmation is performed only once at the beginning or when a problem such as a shifting error occurs.

However, it may not be recognized when the rotational speed of the shift motor is changed due to impact or the like after the power of the vehicle is turned off. Thus, it is preferable that a stopper is provided to fasten a detent pin when the power of the vehicle is turned off so as to prevent the rotation of the shift motor.

Through such a method, the even-numbered finger 12 moves to determine a 6th-speed shift position 6T and an R-speed shift position RT and then determine and learn the 6th/R-range neutral position A in the 6th/R-range shift rail 22, and to a 4th-speed shift position 4T and a 2nd-speed shift position 2T and then determine and learn the 4th/2nd-range neutral position B in the 4th/2nd-range shift rail 23.

The odd-numbered finger 13 moves to determine a 3rd-speed shift position 3T and a 7th-speed shift position 7T and then determine and learn the 3rd/7th-range neutral position C in the 3rd/7th-range shift rail 24, and to determine a 5th-speed shift position 5T and a 1st-speed shift position 1T and then determine and learn the 5th/1st-range neutral position D in the 5th/1st-range shift rail 25.

Accordingly, the reference neutral position RM and the neutral position of the shift rail measured in each speed-range may be deviated by the cumulative tolerance in each speed-range.

That is, as illustrated in FIG. 3, the 6th/R-range neutral position A is deviated to the right from the reference neutral position RM by AA, the 4th/2nd-range neutral position B is deviated to the left from the reference neutral position RM by AB, the 3rd/7th-range neutral position C is deviated to the left from the reference neutral position RM by ΔC, and the 5th/1st-range neutral position D is deviated to the right from the reference neutral position RM by ΔD.

Of course, the occurrence of the positional deviation is an example, and the stroke of each speed-range shift rail may be changed in various forms by the cumulative tolerance.

The neutral positions of the respective speed-range shift rails differ from each other. Therefore, when the control finger moves to the other speed-range shift rails, namely in select movement, it moves to the reference neutral position RM and then moves to the other speed-range shift rails.

In more detail, referring to FIG. 4, when the even-numbered finger 12 as the first control finger reciprocates in the 6th/R-range shift rail 22 to determine the 6th/R-range neutral position A and then moves from the 6th/R-range shift rail 22 to the 4th/2nd-range shift rail 23, the even-numbered finger 12 moves from the 6th/R-range neutral position A to the reference neutral position RM and then moves to the 4th/2nd-range shift rail 23.

When the odd-numbered finger 13 as the second control finger reciprocates in the 3rd/7th-range shift rail 24 to determine the 3rd/7th-range neutral position C and then moves from the 3rd/7th-range shift rail 24 to the 5th/1st-range shift rail 25, the odd-numbered finger 13 moves from the 3rd/7th-range neutral position C to the reference neutral position RM and then moves to the 5th/1st-range shift rail 25.

Accordingly, since the select movement is performed after the control finger is always moved to the reference neutral position RM in the select movement of the control finger, the select movement can be stably performed without colliding with each speed-range shift rail.

Through such a method, it is possible to stably perform gear-shifting in each speed-range shift rail even though the stroke of the shift rail is changed by the cumulative tolerance by individually learning the neutral position of each speed-range shift rail, and to stably perform the select movement without colliding with each speed-range shift rail since the select movement is performed after the control finger moves to the reference neutral position when it moves to the other speed-range shift rails.

As is apparent from the above description, according to the method of setting neutral positions in a transmission gear actuator according to the present disclosure, since the neutral position of each speed-range shift rail is set, it is possible to perform more accurate gear-shifting and prevent incomplete gear engagement by performing the gear-shifting at the neutral position of each speed-range shift rail.

According to the present disclosure, it is possible to reduce a shifting error since the completion determination of gear engagement is robust, and to reduce a shifting time since the learning through absolute position recognition is reduced by applying the angle sensor to the shift motor.

While the specific embodiments have been described with reference to the drawings, the present disclosure is not limited thereto. It will be apparent to those skilled in the art that various changes and modifications may be made without departing from the spirit and scope of the disclosure as defined in the following claims.

What is claimed is:

1. A method of setting neutral positions in a transmission gear actuator, comprising:
   determining a reference neutral position as an absolutely neutral position by reciprocating a shift finger in a free-range shift rail; and
   determining a neutral position of each of a plurality of speed-range shift rails by reciprocating a control finger in each of the plurality of speed-range shift rails,
   wherein the determining of the neutral position of each of the plurality of speed-range shift rails comprises:
   determining a first shift rail's neutral position by reciprocating the control finger in a first shift rail;
   determining a second shift rail's neutral position by reciprocating the control finger in a second shift rail;
   determining a third shift rail's neutral position by reciprocating the control finger in a third shift rail; and
   determining a fourth shift rail's neutral position by reciprocating the control finger in a fourth shift rail, and
   wherein, in the determining of the neutral position of each of the plurality of speed-range shift rails, when the control finger moves from one of the plurality of speed-range shift rails to another of the plurality of speed-range shift rails, the control finger moves from a neutral position of the one of the plurality of speed-range shift rails to the reference neutral position and then moves to the another of the plurality of speed-range shift rails.

2. The method according to claim 1, wherein the free-range shift rail is arranged inside the transmission gear actuator.

3. The method according to claim 1, wherein when the first to fourth shift rails are connected to each other, the determining of the neutral position of each of the plurality of speed-range shift rails further comprises:
performing first select movement in which when the control finger moves from the first shift rail to the second shift rail, it moves from the first shift rail's neutral position to the reference neutral position and then moves to the second shift rail;
performing second select movement in which when the control finger moves from the second shift rail to the third shift rail, it moves from the second shift rail's neutral position to the reference neutral position and then moves to the third shift rail; and
performing third select movement in which when the control finger moves from the third shift rail to the fourth shift rail, it moves from the third shift rail's neutral position to the reference neutral position and then moves to the fourth shift rail.

4. The method according to claim 1, wherein when the first and second shift rails are connected to each other and the third and fourth shift rails are connected to each other, the determining a neutral position of each speed-range shift rail further comprises:
performing first select movement in which when a first control finger moves from the first shift rail to the second shift rail, it moves from the first shift rail's neutral position to the reference neutral position and then moves to the second shift rail; and
performing second select movement in which when a second control finger moves from the third shift rail to the fourth shift rail, it moves from the third shift rail's neutral position to the reference neutral position and then moves to the fourth shift rail.

5. The method according to claim 1, wherein the neutral position of each of the plurality of speed-range shift rails is determined by reciprocating the control finger multiple times in the respective speed-range shift rail and then calculating an average value of a total moved distance of the control finger.

6. The method according to claim 1, wherein an angle sensor is provided to measure an angle of rotation and rotational speed of a shift motor for moving the shift finger and the control finger, and after both of the angle of rotation and rotational speed of the shift motor are set to be "0" at the reference neutral position, the angle of rotation and rotational speed of the shift motor are measured to determine a relative position of the control finger.

7. A method of setting neutral positions in a transmission gear actuator, comprising:
determining a reference neutral position as an absolutely neutral position by reciprocating a shift finger in a free-range shift rail; and
determining a neutral position of each of a plurality of speed-range shift rails by reciprocating a control finger in each of the plurality of speed-range shift rails,
wherein the determining of the neutral position of each of the plurality of speed-range shift rails comprises:
determining a first shift rail's neutral position by reciprocating the control finger in a first shift rail;
determining a second shift rail's neutral position by reciprocating the control finger in a second shift rail;
determining a third shift rail's neutral position by reciprocating the control finger in a third shift rail; and
determining a fourth shift rail's neutral position by reciprocating the control finger in a fourth shift rail,
wherein the control finger comprises a first control finger and a second control finger,
wherein the first and second speed-range shift rails are connected to each other and the third and fourth speed-range shift rails are connected to each other, and
wherein, in the determining of the neutral position of each of the plurality of speed-range shift rails, the first control finger moves to the second shift rail after the determination of the first shift rail's neutral position to determine the second shift rail's neutral position, and the second control finger moves to the fourth shift rail after the determination of the third shift rail's neutral position to determine the fourth shift rail's neutral position.

8. A method of setting neutral positions in a transmission gear actuator, comprising:
determining a reference neutral position as an absolutely neutral position by reciprocating a shift finger in a free-range shift rail; and
determining a neutral position of each of a plurality of speed-range shift rails by reciprocating a control finger in each of the plurality of speed-range shift rails,
wherein an electric current value of a shift motor for moving the control finger when the control finger reciprocates in each of the plurality of speed-range shift rails is measured to determine a portion to which a constant load is applied as both ends of each of the plurality of speed-range shift rails and determine the center thereof as the neutral position.

* * * * *